US008500065B2

(12) United States Patent
Schmid et al.

(10) Patent No.: US 8,500,065 B2
(45) Date of Patent: Aug. 6, 2013

(54) DEVICE FOR SUPPLYING LOADS IN THE OVERHEAD AREA OF A PASSENGER CABIN, IN PARTICULAR IN COMMERCIAL AIRCRAFT

(75) Inventors: Frank Schmid, Poppenricht (DE); Marc Renz, Schwabach (DE); Norbert Knopp, Leinburg (DE); Juergen Grabmann, Nuremberg (DE); Dietmar Voelkle, Biberach (DE); Markus Klingseis, Biberach (DE); Wolf-Dieter Kuhnla, Kaisheim-Leitheim (DE)

(73) Assignee: Diehl Aircabin GmbH, Laupheim (DE)

( * ) Notice: Subject to any disclaimer, the term of this patent is extended or adjusted under 35 U.S.C. 154(b) by 162 days.

(21) Appl. No.: 13/179,794

(22) Filed: Jul. 11, 2011

(65) Prior Publication Data
US 2012/0223184 A1 Sep. 6, 2012

(30) Foreign Application Priority Data
Jul. 10, 2010 (DE) .......................... 10 2010 026 805

(51) Int. Cl.
*B64C 13/00* (2006.01)
(52) U.S. Cl.
USPC ........................ 244/118.5; 244/118.6; 29/428
(58) Field of Classification Search
USPC ............... 244/118.5, 118.6; 105/329.1, 314, 105/344, 347
See application file for complete search history.

(56) References Cited

U.S. PATENT DOCUMENTS

| 5,383,628 | A | * | 1/1995 | Harriehausen et al. | ..... 244/118.1 |
|---|---|---|---|---|---|
| 5,549,258 | A | * | 8/1996 | Hart et al. | ................... 244/118.1 |
| 5,651,733 | A | * | 7/1997 | Schumacher | ................... 454/76 |
| 5,687,929 | A | * | 11/1997 | Hart et al. | ................... 244/118.1 |
| 5,716,027 | A | * | 2/1998 | Hart et al. | ................... 244/118.1 |
| 5,842,668 | A | * | 12/1998 | Spencer | ..................... 244/118.1 |
| 5,921,670 | A | * | 7/1999 | Schumacher et al. | ........ 362/480 |
| 5,938,149 | A | * | 8/1999 | Terwesten | ................... 244/118.5 |
| 5,985,362 | A | * | 11/1999 | Specht et al. | ................. 427/236 |
| 6,007,024 | A | * | 12/1999 | Stephan | ..................... 244/118.1 |
| 6,874,730 | B2 | * | 4/2005 | Harasta | ...................... 244/118.5 |
| 7,097,138 | B2 | * | 8/2006 | Stephan et al. | ............ 244/118.6 |
| 7,258,406 | B2 | * | 8/2007 | Stephan et al. | ............... 312/246 |
| 8,028,957 | B2 | * | 10/2011 | Wolf et al. | ................... 244/118.5 |
| 2001/0011692 | A1 | * | 8/2001 | Sprenger et al. | ........... 244/118.5 |
| 2006/0091257 | A1 | * | 5/2006 | Melberg et al. | ............ 244/118.5 |
| 2007/0095980 | A1 | * | 5/2007 | Bock | ......................... 244/118.1 |
| 2011/0062283 | A1 | * | 3/2011 | Breuer et al. | .............. 244/118.5 |
| 2011/0147520 | A1 | * | 6/2011 | Schneider | .................. 244/118.5 |
| 2011/0180664 | A1 | * | 7/2011 | Bartels et al. | .............. 244/118.5 |
| 2011/0240796 | A1 | * | 10/2011 | Schneider | .................. 244/118.5 |

(Continued)

FOREIGN PATENT DOCUMENTS
DE   102009058801 A1   6/2011

*Primary Examiner* — Christopher P Ellis
*Assistant Examiner* — Medhat Badawi
(74) *Attorney, Agent, or Firm* — Scully, Scott, Murphy & Presser, P.C.

(57) ABSTRACT

Corresponding to reducing the number of components that need to be separately installed, in addition to a weight reduction and a reduction in the cable loom volume, improved system reliability is obtained if the loads relating to a seating space in a passenger cabin (12), in particular in an aircraft, are combined on an overhead panel (17) which is connected, via line connections which are now only short, to a spatially associated supply module (19), which is operated in cutouts (20) in a stub frame (13), in order to anchor a hat rack (11) in the fuselage structure (16) of the cabin (12).

4 Claims, 1 Drawing Sheet

U.S. PATENT DOCUMENTS

2012/0012707 A1* 1/2012 Schliwa et al. ............ 244/118.5
2012/0228425 A1* 9/2012 Schneider et al. ......... 244/118.5
2012/0228426 A1* 9/2012 Schneider et al. ......... 244/118.5
2012/0292445 A9* 11/2012 Rahlff ........................ 244/118.5
2012/0325963 A1* 12/2012 Young et al. ............... 244/118.5

* cited by examiner

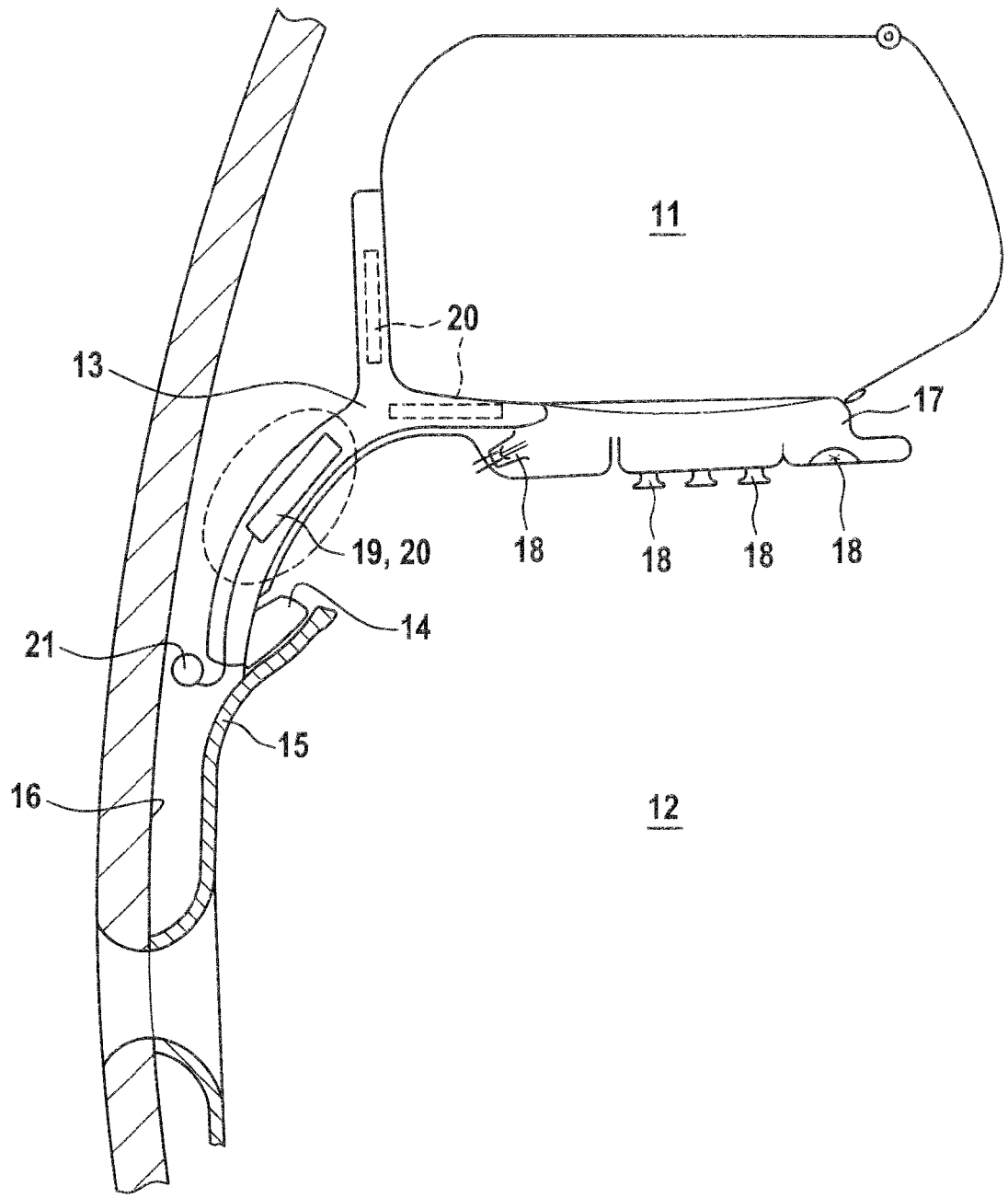

DEVICE FOR SUPPLYING LOADS IN THE OVERHEAD AREA OF A PASSENGER CABIN, IN PARTICULAR IN COMMERCIAL AIRCRAFT

The invention relates to a device according to the precharacterizing clause of the main claim.

One major problem for supplying electricity to loads at passenger seats is the multiplicity of electrical and possibly also optical feed lines which are required and must be laid, for example, for different types of electricity and voltages, as well as different data networks from energy sources and data stores, computers, audio and video sources to the individual load points, with their lights, displays, switches, loudspeakers and plug connections, whose function-related load modules are fitted to the internal cabin lining. This results in weight problems and is time-consuming and susceptible to faults, not least because of the frequent conversion processes in order to respectively adapt the cabin equipment to the current financial requirements. Space problems also occur since, because of the fuselage structure, which comprises frames and stringers and is laid between the outer skin and the inner lining, it is also not possible to lay an indefinite number of thick cable looms from central units to the individual load points, which are distributed throughout the cabin.

The present invention is based on the technical problem of overcoming this.

BRIEF DESCRIPTION OF THE DRAWINGS

FIG. 1 is a broken-off cross-sectional illustration of a stub frame fitted with modules for anchoring an overhead hat rack outside the cabin lining in the fuselage structure in accordance with an embodiment of the present invention.

DETAILED DESCRIPTION

According to the invention, this object is achieved by the essential features specified in the main claim. This is based on the consideration that the overhead load points in question are located under the ceiling hat racks (hand baggage stowage areas), which are themselves held detachably in the fuselage structure at the side above the window seats by means of supporting arms, which have a plurality of arms, at least one of which projects into the cabin, so-called stub frames. A stub frame such as this is normally a thin-walled light-alloy casting, which is made resistant to bending by fitting edge ribs and lateral walls. Supply modules are now inserted into the openings, which are like cavities, located between these stiffening members, in particular such as power stages for power supplies and output amplifiers whose voltages and frequencies are matched for the data, video and audio supply to the loads adjacent to the stub frame. The supply modules are connected to what are now only a small number of standard lines which run through the structure, in the course of fitting a stub frame to the fuselage structure, via plug connecters, in order then to carry out the load-specific conditioning here in situ with line connections, which are now only short, along a supporting arm to the loads.

Developments and modifications relating to the solution according to the invention result from the further claims and, in addition with respect to their advantages, from the following description of one preferred exemplary embodiment of the invention, which is sketched in the drawing, restricted to what is functionally essential. The single figure of the drawing shows a broken-off cross-sectional illustration of a stub frame fitted with modules for anchoring an overhead hat rack outside the cabin lining in the fuselage structure.

The weight of a hat rack 11 (hand baggage stowage compartment) in the upper area of a passenger cabin 12 is held by the fork of a y-shaped, three-armed stub frame 13, and is introduced into the fuselage structure 16 in the vicinity of the strip lights 14 of the cabin lighting, outside the lining 15 (inner lining). A load panel 17 is held parallel thereto. Load panel 17 is fitted with all the load modules 18 (such as lights, switches, displays, loudspeakers and/or plug sockets), such that there is no longer any need to fit individual elements directly to the lining 15. These modules 18 are fed with power and information from at least one local supply module 19.

This is accommodated in at least one cutout 20 in the structured stub frame 13 and, in this case, is connected in the course of its structure fitting to power and information cables 21, which run through the fuselage structure 16. Only a small number of standard cables 21 are therefore now required, in particular for electrical and optical bus structures, since, in fact, the actual feed to the load modules 18 on their panel 17 is now provided in situ in the individually matched supply module 19, for example by means of voltage or frequency converters, data decoders, video converters and video output amplifiers.

Corresponding to reducing the number of components that need to be separately installed, in addition to a weight reduction and a reduction in the cable loom volume, improved system reliability is obtained if the loads relating to a seating space in a passenger cabin 12, in particular in an aircraft, are combined on an overhead panel 17 which is connected, via line connections which are now only short, to a spatially associated supply module 19, which is operated according to the invention in cutouts 20 in a stub frame 13, in order to anchor a hat rack 11 in the fuselage structure 16 of the cabin 12.

List of Reference Symbols
11 Hat rack (in 12)
12 Cabin (within 15)
13 Stub frame (between 16 and 11)
14 Strip light (adjacent to 15)
15 Lining (of 12)
16 Fuselage structure (for 12)
17 Panel (with 18, under 11)
18 Load module (on 17)
19 Supply module (in 20 in 13)
20 Cutout (in 13)
21 Standard cable (to 19)

The invention claimed is:

1. A device for supplying loads in the overhead area of a passenger cabin comprising a stub frame, which is associated with a load panel and is mounted replaceably in the cabin fuselage structure, fitted into cutouts having at least one supply module, and the latter is connected to at least one standard cable and to the panel.

2. The device according to claim 1, wherein the panel is fitted with load modules which are fed from at least one supply module.

3. The device according to claim 1, wherein the panel is held in the vicinity of the stub frame.

4. The device according to claim 1, wherein said overhead area of a passenger cabin is in a commercial aircraft.

* * * * *